United States Patent [19]
Miller et al.

[11] Patent Number: 5,441,298
[45] Date of Patent: Aug. 15, 1995

[54] APPARATUS FOR STABILIZING AN ELECTRIC ACTIVE SUSPENSION SYSTEM UPON INTERRUPTION OF THE POWER SUPPLY

[75] Inventors: John M. Miller, Saline; Richard J. Hampo, Livonia; Roy I. Davis, Canton, all of Mich.

[73] Assignee: Ford Motor Company, Dearborn, Mich.

[21] Appl. No.: 139,680

[22] Filed: Oct. 22, 1993

[51] Int. Cl.⁶ .......................................... B60G 17/015
[52] U.S. Cl. ...................................... 280/707; 318/379
[58] Field of Search ................ 280/707; 188/299; 318/379, 380, 434; 361/31

[56] References Cited
U.S. PATENT DOCUMENTS

| | | | |
|---|---|---|---|
| 4,473,856 | 9/1984 | Takahashi et al. | 361/31 |
| 4,892,328 | 1/1990 | Kurtzman et al. | 280/707 |
| 4,969,662 | 11/1990 | Stuart | 280/707 |
| 4,981,309 | 1/1991 | Froeschle et al. | 280/707 |
| 4,990,837 | 2/1991 | Ishitobi | 318/379 |
| 5,027,048 | 6/1991 | Masrur et al. | 318/806 |
| 5,028,073 | 7/1991 | Harms et al. | 280/840 |
| 5,060,959 | 10/1991 | Davis et al. | 280/6.1 |
| 5,070,284 | 12/1991 | Patel et al. | 318/362 |
| 5,229,695 | 7/1993 | Tsuda et al. | 361/31 |

*Primary Examiner*—Karin L. Tyson
*Assistant Examiner*—Paul N. Dickson
*Attorney, Agent, or Firm*—Kevin G. Mierzwa; Roger L. May

[57] ABSTRACT

An apparatus for stabilizing an active suspension system of an automotive vehicle is provided having a power source and a motor with a plurality of stator wires connected to the suspension unit for controlling the movement of the suspension. A controller is electrically connected to the motor and to the power source for developing current commands for input into the motor through the stator wires. The switch, electrically connected to the stator wires and the power source, connects the stator wires together in response to an interruption of the power source so that a high torque is developed in the motor for restraining the movement of the suspension unit.

15 Claims, 3 Drawing Sheets

APPARATUS FOR STABILIZING AN ELECTRIC ACTIVE SUSPENSION SYSTEM UPON INTERRUPTION OF THE POWER SUPPLY

BACKGROUND OF THE INVENTION

The invention relates generally to an active suspension system for an automobile, and more particularly to stabilizing an electric active suspension upon interruption of the power supply to the suspension during key off.

Various types of active suspension systems have been proposed which are capable of responding to road inputs in real time with power inputs having sufficient robustness to control body motion of an automotive vehicle. As used herein, the term "active suspension" means a suspension which has a frequency response and power output characteristics sufficient to respond in real time to control force inputs to the vehicle chassis arising from such sources as road imperfections, crosswinds, and vehicle turning maneuvers. As used herein, the terms "body" and "chassis" mean either a conventional unitized automotive body or conventional frame and body automobile or any combination thereof. Active suspensions can be hydraulic systems wherein a hydraulic actuator in conjunction with complex valve componentry is used to maintain the ride and handling characteristics of the vehicle as well as the vehicle height at its optimum considerations. Other types of active suspension systems are electrically powered systems such as those disclosed in U.S. Pat. Nos. 5,027,048; 5,060,959 both assigned to the assignee of the present invention, as well as 5,028,073; 4,969,662; and 4,892,328.

Active suspensions are particularly suited for use in high profile vehicles such as sport/utility vehicles, pickup trucks or vans. A feature that can be provided for these vehicles is to lower the suspension below the designed ride height to a jounce position to facilitate entry and exit to and from the vehicle. One known method of accomplishing this result is to bleed off air from an air suspension system. One drawback of such a system is that it takes a relatively large amount of time to lower the suspension down to a desired level. Another disadvantage is that the air suspension also needs a considerable amount of time to increase the air volume in the system to raise the suspension back to the design height.

One proposed concept for a fail-safe system is disclosed in commonly owned U.S. Pat. No. 5,070,284. The fail-safe system described therein places a resistance in the circuit should the suspension fail while the vehicle is in operation. When the vehicle is in operation, the vehicle suspension is powered by the engine alternator. The system provides a known load resistance to force the suspension to simulate an actual shock absorber. This system, however, cannot be used if the vehicle is not in operation or the power source fails. If the vehicle was, for example, in the key off position with the vehicle in a jounce or extended jounce position and the power source is interrupted, the electric suspension releases and returns to its design height at a rate controlled only by the spring constant and the vehicle mass. This rate would generally be uncomfortable for a passenger.

It is therefore desirable to restrain the rate of release of an electric active suspension should an interruption in a power source occur when the vehicle is in a jounce position.

SUMMARY OF THE INVENTION

An advantage of the present invention is that the release of an electric active suspension can be controlled during an interruption of the power source.

The present invention includes a power source and a motor with a plurality of stator wires connected to the suspension for controlling the movement of the suspension. A controller is electrically connected to the motor and to the power source for developing current commands for input into the motor through the stator wires. The switch, electrically connected to the stator wires and the power source, connects the stator wires together in response to an interruption of the power source so that a high torque is developed in the motor for restraining the movement of the suspension.

DETAILED DESCRIPTION OF THE PREFERRED EMBODIMENT

Figure 1:
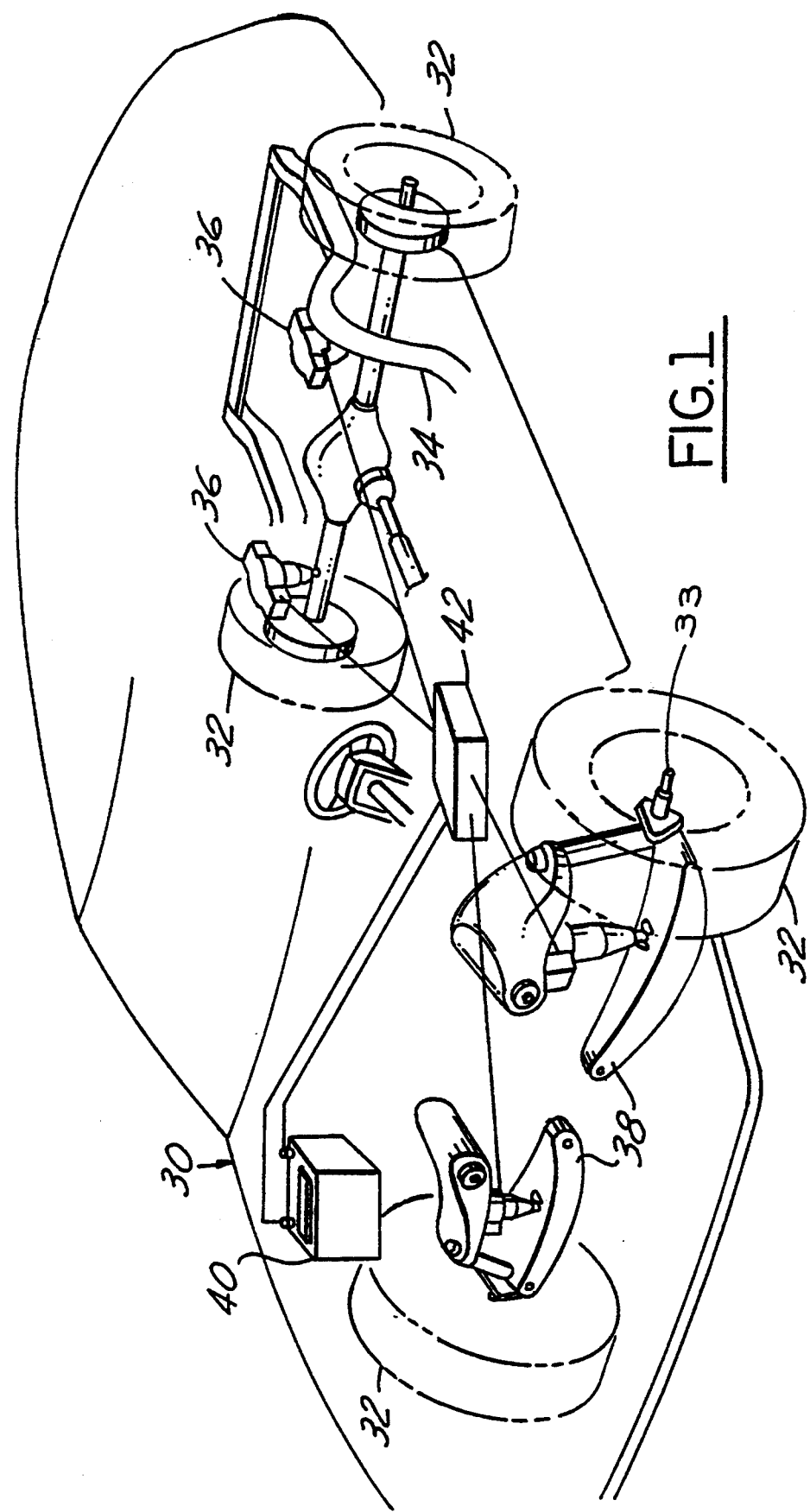
FIG. 1 is a schematic view of a suspension system according to the present invention.

Referring now to FIG. 1, a vehicle 30 having an electrically powered active suspension according to the present invention includes a plurality of road wheel and tire assemblies 32 rotatably attached at spindles 33. The vertical displacement of the road wheel and tire assemblies relative to the chassis of vehicle 30 is controlled by means of electric active suspension units 36 generally mounted resiliently between chassis 34 and a lower control arm 38. Each of the suspension units 36 is electrically connected to a power source, such as a vehicle battery 40 as well as to a central controller 42.

Figure 2:
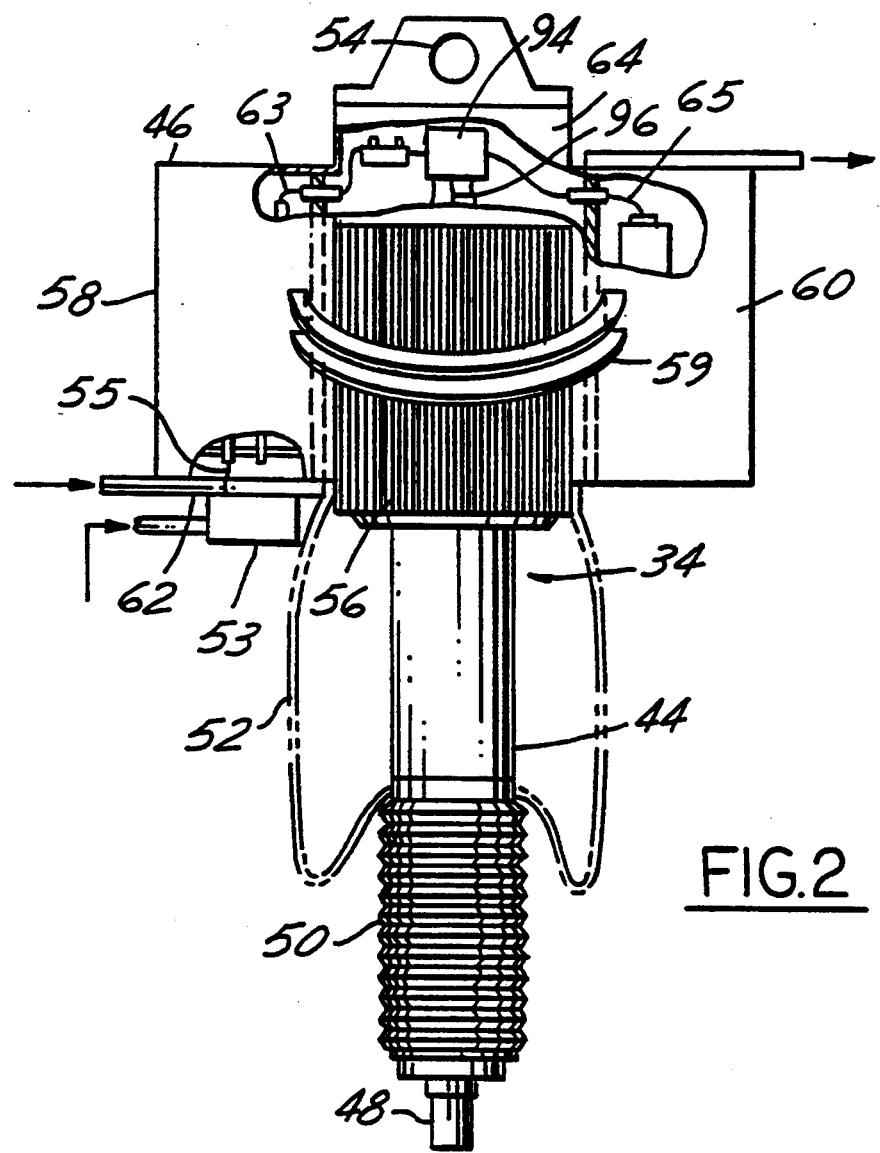
FIG. 2 is a side elevational, partially cross-sectional cutaway view of the upper and lower electric motor housings according to the present invention.
Figure 3:
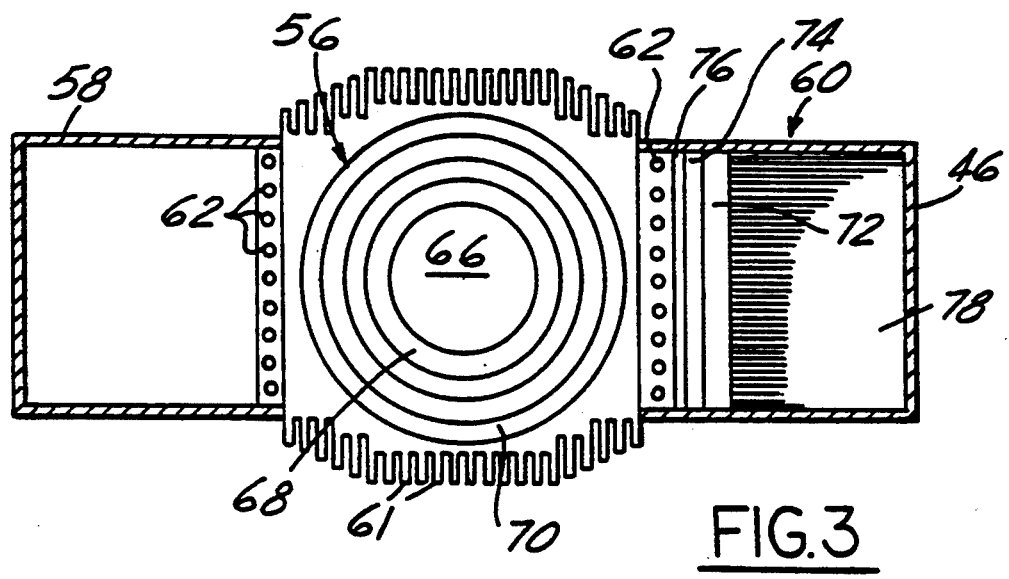
FIG. 3 is a top plan view of the upper electric motor housing.

One type of electrically powered suspension unit structured in accord with the principles of the present invention is shown in FIGS. 2 and 3. The suspension unit 26 comprises an electric motor driving a threaded rod and ball screw assembly such as disclosed in U.S. Pat. Nos. 5,027,048 and 5,060,959 at columns 6–8 and as shown generally in FIGS. 2 and 4 of those patents which are commonly owned by the assignee and are hereby incorporated by reference. The suspension unit 36 includes a lower housing 44 and an upper housing 46. The lower housing 44 includes a mounting hole 48 for attachment of the unit to the lower control arm 38 of the vehicle as well as bellows 50 for accommodating the jounce and rebound excursions of the suspension unit. An optional rolling lobe air spring 52 may be secured directly to suspension unit 36 or may be supplied in parallel with suspension unit 36. A solenoid 53 receives signals from system controller 58 through solenoid control wires 55 to add or vent pressurized air to the rolling lobe air spring 52 from a remote compressor. As explained above, the primary purpose of the air spring and its associated compressor is to support the static weight of the vehicle to reduce the overall power draw on the electrically powered suspension unit 36. The solenoid 53 not only provides pressurized air to the air spring 52, but may also provide pressurized air to other portions of the upper housing 46 of the suspension unit such as, for example, the motor and controller compartments. This provides an advantage in that the motor compartment, surrounded with pressurized air at approximately 200 psi, operates in a clean, dry environment.

The upper housing 46 includes a mounting eye assembly 54 for attaching the suspension unit 36 to the vehicle chassis 34 and includes a predetermined volume enclosing an electric motor 56, the system controller 58 and the power electronics module 60, the details of which will be described in greater detail below. The upper housing 46 may further include a current sensor and encoder module 64 as well as cooling means such as shown by fluid conduits 62. The cooling conduits 62 regulate the temperature within the housing 46. The upper housing may also include a communications channel 59 for housing the electrical wiring or other communication lines between the various components and motor in the housing. Alternatively, this channel 59 could be disposed interior of the motor housing.

Referring now to FIG. 3, there is shown a top plan view of the suspension unit 36 of the present invention. Upper housing 46 encases the electric motor 56, the system controller 58, and the power electronics module 60. Upper housing 46 further includes a plurality of cooling fins 61 surrounding motor 56 to provide heat dissipation for motor 56. Cooling can also be increased by placing a cooling fin or vent (not shown) on the vehicle chassis 34 to direct air over suspension unit 36. As such, cooling fins 61 in conjunction with the fluid conduit 62 comprise cooling means for regulating the temperature of the housing 46 and the internal components thereof.

As is fully described in U.S. Pat. No. 5,027,048, motor 56 includes a rotor 68 and stator 70 circumferentially disposed around a shaft 66. The shaft 66 is connected to a ball screw assembly which, upon rotation of shaft 66, causes extensionary travel of the suspension unit 36. As previously noted the present invention may be practiced with permanent magnet, induction, variable and synchronous reluctance or inductance motors, or yet other types of motors suggested by this disclosure. Furthermore, the present invention is not meant to be limited solely to a suspension unit 36 having an electric motor, but may also be practiced with a suspension unit having an electromagnetic device which creates a force on a magnetically conductive member in response to current generated by signal controller such as is shown in U.S. Pat. No. 4,892,328.

As further shown in FIG. 3, the power electronics module 60 includes an area 72 for a gate drive circuit, an area 74 for the power devices and an isolation area 76 disposed adjacent the motor on a side of the motor diametrically opposed from the system controller 58. The power electronics module 60 synthesizes an input current sent to the motor 56 in response to current commands generated by the system controller 58 to respond in real time to force inputs acting upon the suspension unit 36. The system controller 58 is electrically connected to the motor by wires 63 and to the power module 60 by wires 65 (or alternatively through channel 59) and dynamically develops current commands for the motor in response to the operating parameters of the motor as will be explained below. The system controller 58 is disposed adjacent the motor in the housing as shown in FIG. 3.

The housing 46 may further include an area for receiving capacitor banks 78 therein. The capacitor bank area 78 may include a multilayer ceramic (MLC) capacitor in addition to an electrolytic capacitor which functions to supply power to suspension unit 36 and motor 56. Although the capacitor 78 has been shown as comprising a single unit, for certain applications of the system according to the present invention it may be desirable to use a plurality of high volumetric efficiency capacitors such as an electrochemical doublelayer capacitor (EDLC) (known as super capacitors or ultracapacitors), with the capacitors being stackable one to another so that in the event of a failure of one capacitor, it can be easily removed from the housing 46 and replaced without the need to replace the entire suspension actuator 36.

Figure 4:
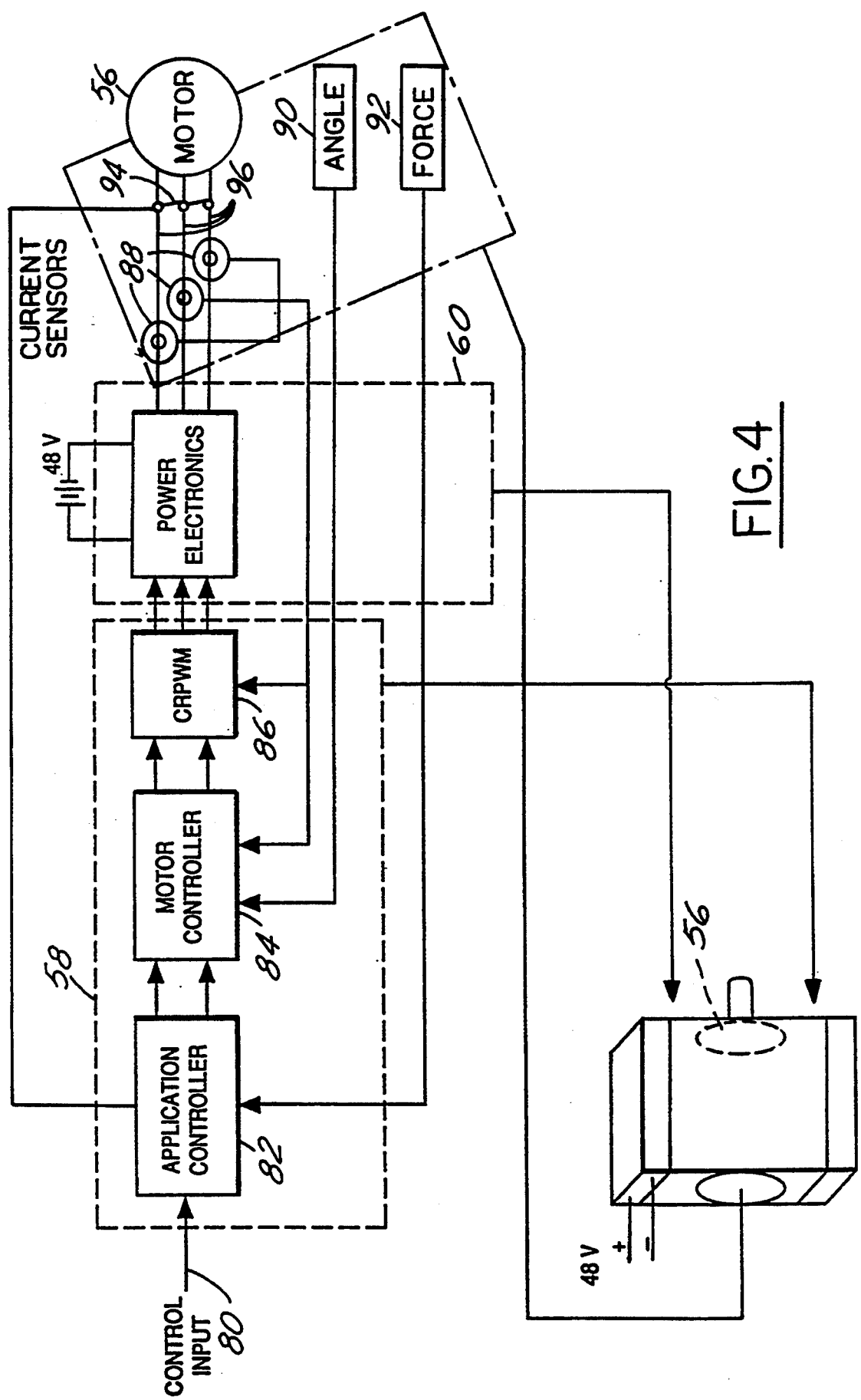
FIG. 4 is a block diagram of the control system for the suspension.

FIG. 4 shows a functional schematic block diagram of an integrated suspension actuator according to the present invention. The integrated suspension actuator includes a motor 56, a system controller 58 and a power electronics module 60 electrically connected to a power source shown as a 48-volt power source. The system controller 58 includes an application controller 82, a motor controller 84 and a current regulator 86 such as a current regulated pulse width modulator (CRPWM). In operation, an input control signal 80 (force command) generated by the central controller 42 is sent to the system controller 58 of the suspension unit 36. There the control signal 80 is directed to an application controller 82 which functions to signal the system controller what total body functions the vehicle is performing. For example, the application controller 82 receives a signal indicating that the vehicle is experiencing dive or a relative lowering of the front of the car with respect to the rear, due to braking of the vehicle. From the application controller 82 the signal is sent to a motor controller 84, such as a digital signal processor (DSP). Motor controller determines or calculates the current commands needed to be sent to motor 56 to respond to the force acting upon suspension unit 36. The signal is then conditioned by CRPWM at 86 and sent to the power electronics module 60 which synthesizes and generates a desired command to the motor.

As shown in FIG. 4, the motor controller 84 further receives information from a plurality of current sensors 88 and a motor angle sensor 90. Current sensors 88 are integrated digital type sensors with isolated signal conditioning capable of producing a digital signal. Other types of current sensors may also be utilized which generate an analog signal. In such case, an analog to digital converter will be required for the system. By measuring the exact current produced in each of the three phases of the motor, it is possible to determine what force the motor is producing at any given instant without the need for a dedicated force sensor such as a load cell. This is essential in determining what amount of force is necessary to respond to the inputs on the actuator to maintain the vehicle ride and handling characteristics at their optimal. The motor angle sensor 90 may comprise an optical encoder for determining the precise rotary location of the armature of the motor 56. By knowing the precise rotary location of the armature, the position of the sprung and unsprung mass of the vehicle relative to one another can be calculated by the motor controller. In this regard, the use of an external height sensor is unnecessary. Those skilled in the art will appreciate that other types of encoders or positioners may be employed for the purpose of providing position information needed for electronic commutation purposes such as resolvers and capacitive type encoders. The system may also include a force sensor 92 which communicates with motor 56 and application controller 82 for the purposes of closed loop control, but as explained above, may be eliminated by directly measuring the exact current produced in each phase of the motor. The electrical schematic details of the system controller 58 are shown in further detail and are extensively described in U.S. Pat. No. 5,027,048 at FIG. 6.

The present invention also includes a switch 94 connected to stator winding phase wires 96 of motor 56 between current sensors 88 and motor 56 which is preferably housed in encoder module 64. Switch 94 can be placed in another location such as between the power electronics and current sensors 88, but it is preferred to locate switch 94 as close to motor 56 as possible.

Switch 94 provides a short circuit between the three stator wires 96. Switch 94 can take the form of a solenoid activated bar or a relay which is normally closed when power is interrupted and normally open when power or a control signal is supplied. Switch 94 can also be controlled by a control signal from controller 42. The short circuit between stator wires 96 through switch 94 results in the development of high torque in motor 56 which holds the motor to counteract the air spring force. The lower the internal resistance of motor 56, the higher the torque generated when stator wires 96 are shorted together. Therefore, having the short circuit as close to the stator windings as possible minimizes the internal resistance of motor 56. Switch 94 can be activated at any operating point of power electronics module 60 without damage. An overcurrent flag is immediately set by digital current sensors 88 signaling motor controller 84 to logically inhibit the power electronics.

When power is supplied during the key-on situation the system can switch a resistor into the control circuit to simulate the damping rate of a vehicle as described in U.S. Pat. No. 5,070,284. However, this is not possible when the vehicle is in the key-off position because the alternator cannot be used as an alternative power supply. In operation, switch 94 causes motor 56 to hold the suspension in two situations. The first situation occurs when the power to suspension is interrupted when vehicle 30 is in a kneel down or jounce position. Providing such a lowering feature is useful especially in a high profile vehicle such as a sport/utility vehicle because the suspension can lower several inches to a jounce or extended jounce position for ingress and egress to make accessibility to the vehicle easier. Lowering vehicle 30 in the present invention is accomplished by causing motor 56 to compress air spring 52 without venting the pressure inside air spring 52. Not releasing the air pressure in air spring 52 is desirable because of the large amount of time required for depressurization and repressurization. Such a configuration without the present invention would cause the suspension to suddenly release if the power was interrupted while the vehicle was in a key-off situation (e.g., when the vehicle is parked) because the resistors (as described in U.S. Pat. No. 5,070,284) would have no effect on the damping rate because no current flows through them. Switch 94 is normally closed consequently, when power is interrupted, stator wires 96 are shorted together and motor 56 enters a high torque state. Switch 94 allows motor 56 to hold air spring 52 compressed and the vehicle to remain lowered for ingress and egress. Depending on the air spring force and the holding torque, several situations are possible. It is most desirable to have the holding torque provide enough strength to hold air spring 52 compressed for a predetermined period of time to permit egress from the vehicle. However, a higher torque can hold the vehicle for longer periods. During the predetermined period of time, the vehicle will gradually raise to the design height. When entry of the vehicle is desired, the suspension controller could be used in conjunction with a remote keyless entry system to lower the vehicle when the locks are unlocked from a key fob. An advantage of the system is that the air spring need not bleed off any volume which takes a long period of time to build back up. After the vehicle is entered, the system can actively raise the vehicle back to its design height before the vehicle is driven in a short period of time, for example, in 5 seconds or less. Switch 94 can remain closed when the vehicle is parked. When switch 94 is closed, the vehicle will have a very high damping rate which will give the vehicle a solid feel when loading and unloading.

The second way the switch can be used is as a backup controlled by controller 42. If the suspension unit at one corner of the vehicle loses its full holding power, current sensors 88 will generate an overcurrent signal to central controller 42 which will activate switches 94 at the other corners of the vehicle. All motors are held in a high torque state so that the vehicle is evenly held. The vehicle suspension can then evenly release at a controlled rate to the design height as described above. A signal also be provided to signal the vehicle operator of a system irregularity.

Various modifications will be apparent to those skilled in the art. For example, different kinds of switches such as solid state switches may be employed and various operating strategies of motor controller 84 such as commanding a continuous zero vector to the power electronics. All such modifications would be within the scope of this invention.

What is claimed is:

1. An apparatus for controlling an electric active suspension for a motor vehicle having a plurality of wheels and a power source comprising:
   motor means connected to the suspension for controlling the movement of the suspension, said motor means having a plurality of stator wires;
   control means electrically connected to said motor means and to said power source for developing current commands for input into said motor means through said stator wires;
   switching means electrically connected to said stator wires and said power source for electrically connecting said plurality of stator wires together in response to a disconnection of said power source so that a high torque is developed in said motor means for restraining the movement of the suspension;
   wherein said switching means comprises a solenoid and plunger, said solenoid being operative to move said plunger upon energization thereof so that said stator wires are not electrically connected.

2. The apparatus as recited in claim 1 wherein said motor means is a permanent magnet motor.

3. The apparatus as recited in claim 1 wherein said motor means has phases, each phase having a stator wire.

4. The apparatus as recited in claim 2 wherein one motor means is provided at each wheel of said vehicle.

5. The apparatus as recited in claim 4 wherein said switching means electrically connects said stator wires together within each motor.

6. The apparatus as recited in claim 1 wherein said solenoid is operative to electrically connect said stator wires together upon deenergization.

7. An apparatus for controlling an electric active suspension unit for a motor vehicle comprising:
   a power source;
   motor means for controlling the vertical displacement moving of the suspension unit, said motor means having a plurality of stator wires;
   control means electrically connected to said motor means and to said power source for developing current commands for input into said motor means through said stator wires;
   current sensing means connected to said stator wires for sensing the current in said stator wires, said current sensing means providing an overcurrent fault signal to said control means upon a condition of overcurrent; and
   switching means electrically connected to said control means for electrically connecting said stator wires together in the event of a detection of an overcurrent fault from said current sensing means so that a high restraining torque is developed in said motor means;
   wherein said switching means comprises a solenoid and plunger, said solenoid being operative to move said plunger our of contact with said stator wires so that said stator wires are not electrically connected.

8. The apparatus as recited in claim 7 wherein said motor means is a permanent magnet motor.

9. The apparatus as recited in claim 7 wherein said motor means has phases, each phase having a stator wire.

10. The apparatus as recited in claim 8 wherein one suspension unit, motor means and control means is provided at each wheel of said vehicle.

11. The apparatus as recited in claim 10 wherein said switching means electrically connects said stator wires from within each motors.

12. The apparatus as recited in claim 7 wherein said solenoid being operative to, upon detection of a fault by said current sensing means, electrically connect said stator wires together.

13. The apparatus as recited in claim 7 wherein said current sensing means is provided for each stator wire.

14. A suspension system for a vehicle having sprung and unsprung masses, comprising:
   a plurality of suspension units, each unit having an air spring in parallel with an electrically controlled damping unit, each of said units having a motor with a plurality of stator phase leads;
   control means electrically connected to said motor and to said power source for developing current commands for input into said motor through said stator phase leads;
   current sensing means connected to said stator phase leads for sensing current in said stator phase leads, said current sensing means providing an overcurrent fault signal no said control means upon a condition of overcurrent; and
   switching means electrically connected to said control means for electrically connecting said stator phase leads in the event of a detection of an overcurrent fault from said current sensing means so that a high restraining torque is developed in said motor;
   wherein said switching means comprises a solenoid and plunger, said solenoid being operative to move said plunger out of contact with said stator phase leads so that said stator phase leads are not electrically connected.

15. The apparatus as recited in claim 14 wherein said motor is a permanent magnet motor.

* * * * *